(12) United States Patent
Kikata et al.

(10) Patent No.: US 9,727,222 B2
(45) Date of Patent: Aug. 8, 2017

(54) DEVICE HAVING MENU DISPLAY FUNCTION

(71) Applicant: Yamazaki Mazak Corporation, Niwa-gun (JP)

(72) Inventors: Kazuhiro Kikata, Niwa-gun (JP); Morikuni Kimura, Niwa-gun (JP); Takuro Katayama, Niwa-gun (JP); Shunsuke Koike, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 15/438,770

(22) Filed: Feb. 22, 2017

(65) Prior Publication Data

US 2017/0168699 A1 Jun. 15, 2017

Related U.S. Application Data

(63) Continuation of application No. PCT/JP2014/073321, filed on Sep. 4, 2014.

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/0488* (2013.01); *G06F 17/2241* (2013.01)

(58) Field of Classification Search
CPC combination set(s) only.
See application file for complete search history.

(56) References Cited

U.S. PATENT DOCUMENTS 9,389,758 B2 * 7/2016 Wakabayashi ..... H04N 5/23209
9,645,698 B2 * 5/2017 Himberger ............ G06F 3/0481
(Continued)

FOREIGN PATENT DOCUMENTS

| CN | 102859452 | 1/2013 |
|---|---|---|
| JP | 07-078015 | 3/1995 |

(Continued)

OTHER PUBLICATIONS

Chinese Office Action for corresponding CN Application No. 201480076828.3, Mar. 20, 2017.
(Continued)

*Primary Examiner* — Hien Duong
(74) *Attorney, Agent, or Firm* — Mori & Ward, LLP

(57) ABSTRACT

A device includes a CPU and a touch-panel display. In a first display mode, when control functions that belong to a first level are assigned to menu switches of a plurality of menus, one of the menus is displayed. In a second display mode, all the menus are displayed. A change switch is provided in a menu display selection area, and includes a plural-row mark to indicate that a plurality of menus exist at the first level. The CPU switches between the modes to display one or all menus in the menu display selection area. When a plurality of menus exist at the first level, the plural-row mark is displayed; otherwise, the plural-row mark is erased. When the menus are displayed in the second display mode, the plural-row mark is lit. When the menu is displayed in the first display mode, the plural-row mark is unlit.

7 Claims, 19 Drawing Sheets

(51) Int. Cl.
*G06F 3/0482* (2013.01)
*G06F 3/0488* (2013.01)
*G06F 17/22* (2006.01)

(56) References Cited

U.S. PATENT DOCUMENTS

| | | | |
|---|---|---|---|
| 2003/0032455 A1* | 2/2003 | Watanabe | H04M 1/72583 455/566 |
| 2005/0119031 A1* | 6/2005 | Spalink | G06F 3/0482 455/566 |
| 2006/0036568 A1* | 2/2006 | Moore | G06F 17/30126 |
| 2006/0036965 A1* | 2/2006 | Harris | G06F 3/0481 715/777 |
| 2006/0242122 A1* | 10/2006 | DeVorchik | G06F 17/30106 |
| 2007/0136691 A1* | 6/2007 | Lance | G06F 3/048 715/827 |
| 2008/0184171 A1* | 7/2008 | Sato | G06F 3/0482 715/841 |
| 2009/0106702 A1* | 4/2009 | Park | G06F 3/0482 715/841 |
| 2009/0228832 A1* | 9/2009 | Cheng | G06F 3/0482 715/810 |
| 2009/0315867 A1* | 12/2009 | Sakamoto | G06F 3/03547 345/184 |
| 2010/0064258 A1* | 3/2010 | Gorczowski | G06F 3/0482 715/841 |
| 2010/0203904 A1* | 8/2010 | Khokhlov | G06F 1/1626 455/457 |
| 2010/0318905 A1* | 12/2010 | Rakesh | G06F 3/0488 715/702 |
| 2010/0332325 A1* | 12/2010 | Holte | G06Q 30/0256 705/14.54 |
| 2011/0047459 A1* | 2/2011 | Van Der Westhuizen | G06F 1/1692 715/702 |
| 2011/0320984 A1* | 12/2011 | Irani | G06F 3/0482 715/841 |
| 2012/0072867 A1* | 3/2012 | Schlegel | G06F 3/0481 715/808 |
| 2012/0159375 A1* | 6/2012 | Shaw | G06F 3/0483 715/777 |
| 2012/0198547 A1* | 8/2012 | Fredette | G06F 8/34 726/19 |
| 2013/0007658 A1* | 1/2013 | Loughlin | G06F 3/0483 715/810 |
| 2013/0019201 A1* | 1/2013 | Cabrera-Cordon | G06F 3/04842 715/810 |
| 2013/0307801 A1* | 11/2013 | Nam | G06F 3/041 345/173 |
| 2013/0326421 A1* | 12/2013 | Jo | G06F 3/0482 715/841 |
| 2014/0165003 A1* | 6/2014 | Branton | G06F 3/0488 715/835 |
| 2014/0189574 A1* | 7/2014 | Stallings | G06F 3/0482 715/781 |
| 2014/0310605 A1* | 10/2014 | Basile | H04L 41/22 715/736 |
| 2015/0177919 A1* | 6/2015 | Lee | G06F 3/0482 715/841 |

FOREIGN PATENT DOCUMENTS

| | | |
|---|---|---|
| JP | 07-078016 | 3/1995 |
| JP | 2003-140716 | 5/2003 |
| JP | 2004-314184 | 11/2004 |
| JP | 2006-024144 | 1/2006 |
| JP | 2009-193568 | 8/2009 |
| JP | 2010-097574 | 4/2010 |
| JP | 4329805 B2 | 4/2017 |
| WO | WO 2012/016014 | 2/2012 |
| WO | WO 2014/118435 | 8/2014 |

OTHER PUBLICATIONS

International Search Report for corresponding International Application No. PCT/JP2014/073321, Dec. 9, 2014.
Japanese Office Action for corresponding JP Application No. 2015-547167, Jan. 5, 2016 (w/ English machine translation).

* cited by examiner

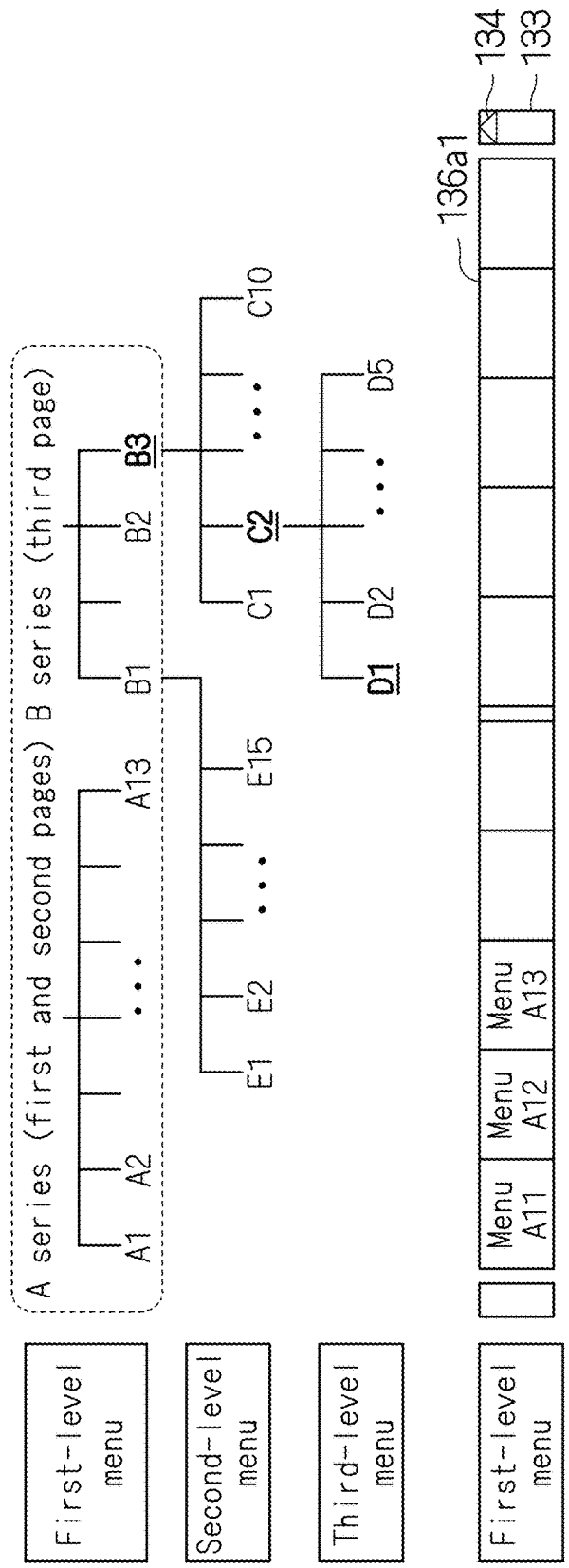

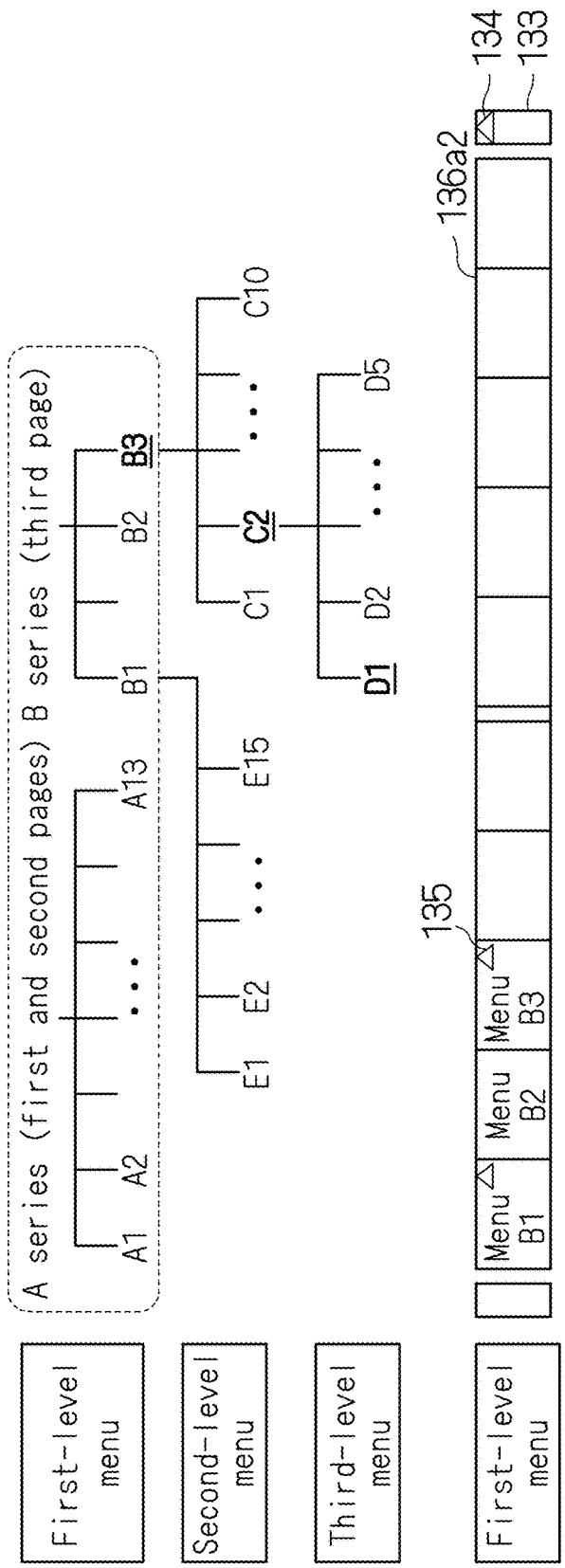

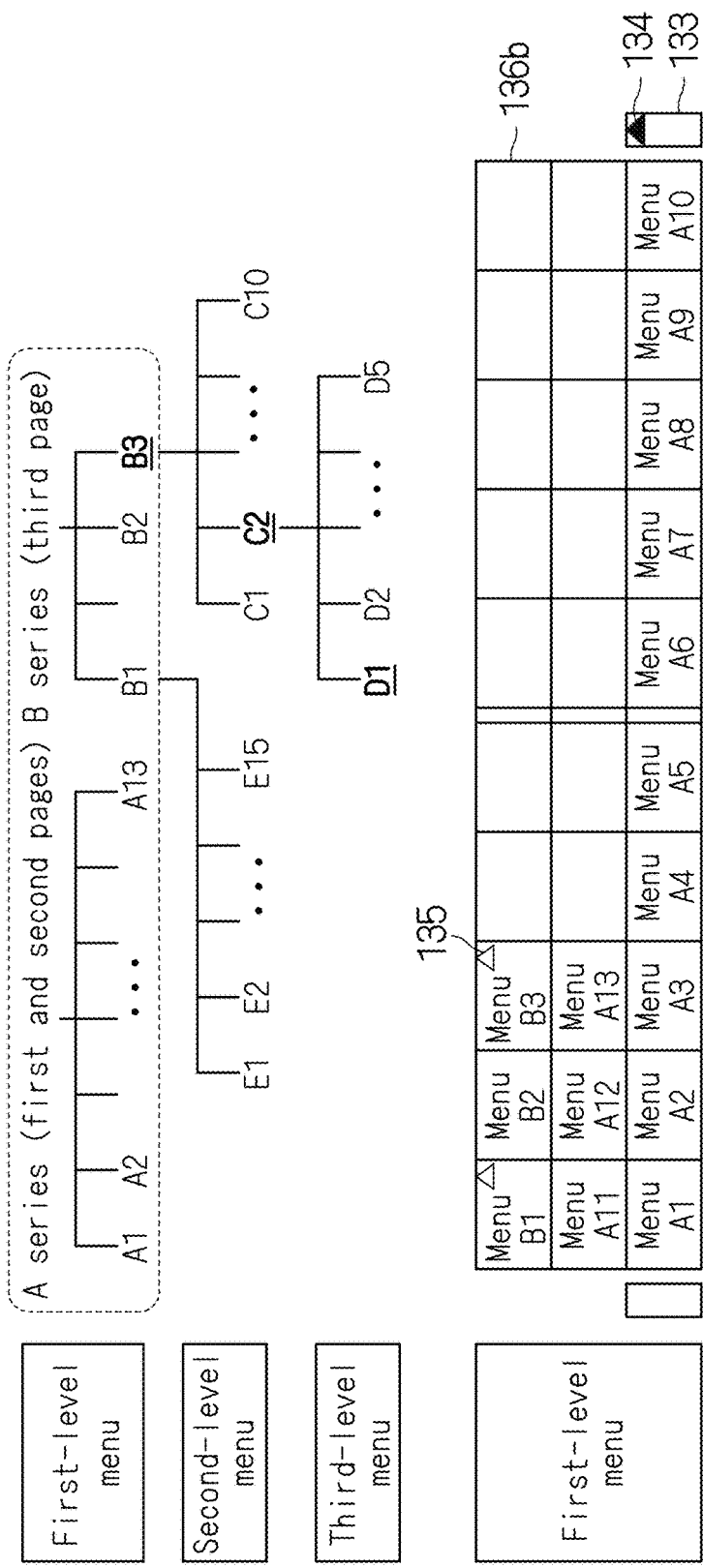

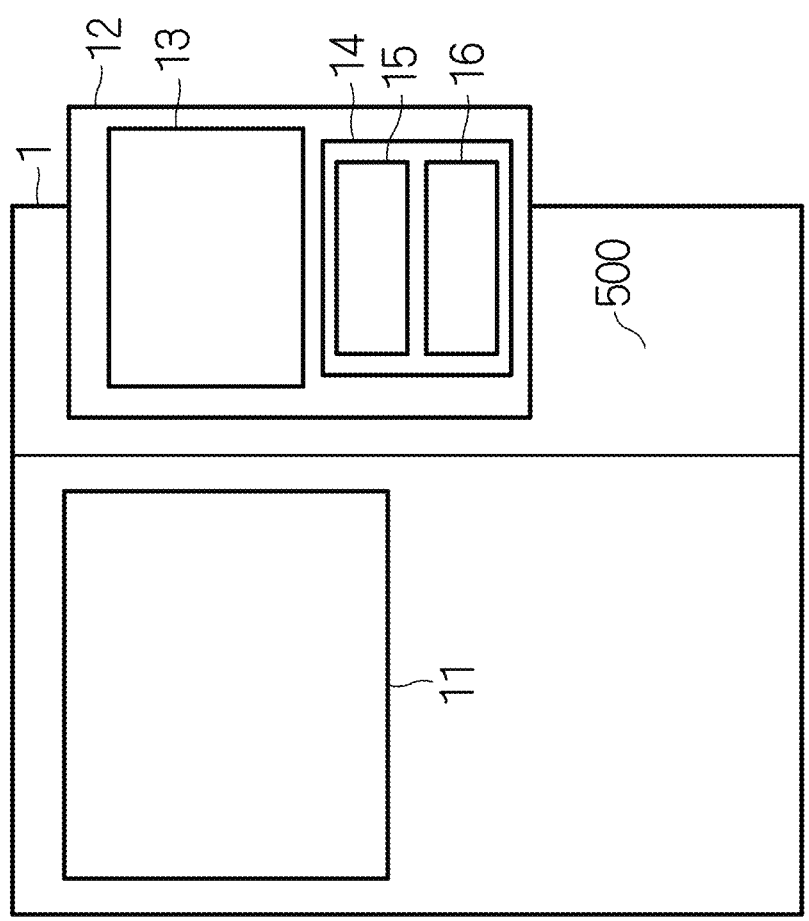

FIG. 3

| Uno. | Unit | Machining portion | Cut-X | Cut-Z | Finishing allowance-X | Finishing allowance-Z | | | | | |
|---|---|---|---|---|---|---|---|---|---|---|---|
| 4 | Bar | Outer diameter | 120. | 0. | 0.1 | 0.1 | | | | | |

| Sno. | Tool | Nominal size | No. # | Pattern | Cut 1 | Cut 2/time | Cut 3 | Margin-X | Margin-Z | Peripheral speed | Feed M M M |
|---|---|---|---|---|---|---|---|---|---|---|---|
| R | 1 lathe-turning | Outer diameter | 25. A | 0 | 4 | @ | @ | @ | 0. | 120 | 0.4 |
| F | 2 lathe-turning | Outer diameter | 25. A | @ | @ | @ | @ | 0. | 0. | 196 | 0.1 |

| FIG PTN | Front corner | Start point-X | Start point-Z | End point-X | End point-Z | Rear corner/S | R/θ | Roughness |
|---|---|---|---|---|---|---|---|---|
| 1 line | | @ | @ | 44. | 50. | @ | @ | |
| 2 taper | | 44. | 50. | 32. | 75. | @ | @ | |
| 3 line | | @ | @ | 32. | 80. | @ | @ | |
| Program | ... | | | | | | | |

[Tabs: Point machining | Line machining | Face machining | Lathe-turning | Single action | Basic coordinates | Auxiliary coordinates | End] [>>]

FIG. 4A — 137a

| Point machining | Line machining | Face machining | Lathe turning | Single action | Basic coordinates | Auxiliary coordinates | End | | >>> |
|---|---|---|---|---|---|---|---|---|---|
| △ | △ | △ | △ 135 | | | | | | |

FIG. 4B — 137b

| Program end | Search | Calculate | Process end | TPC | Insert | Basic coordinates | Shape copy | Unit copy | Program copy | Help |
|---|---|---|---|---|---|---|---|---|---|---|
| Select head | Transfer workpiece | | | | Basic coordinate shift | | Erase | | Simultaneous machining | >>> |
| △ C-axis point machining | △ C-axis line machining 135 | | Index | M code | Sub-program | Coordinate measurement | Workpiece measurement | Tool measurement | Double workpiece machining | >>> |
| △ Point machining | △ Line machining | △ Face machining | △ Lathe turning | | Single action | Basic coordinates | Auxiliary coordinates | End | Workpiece shape | >>> |

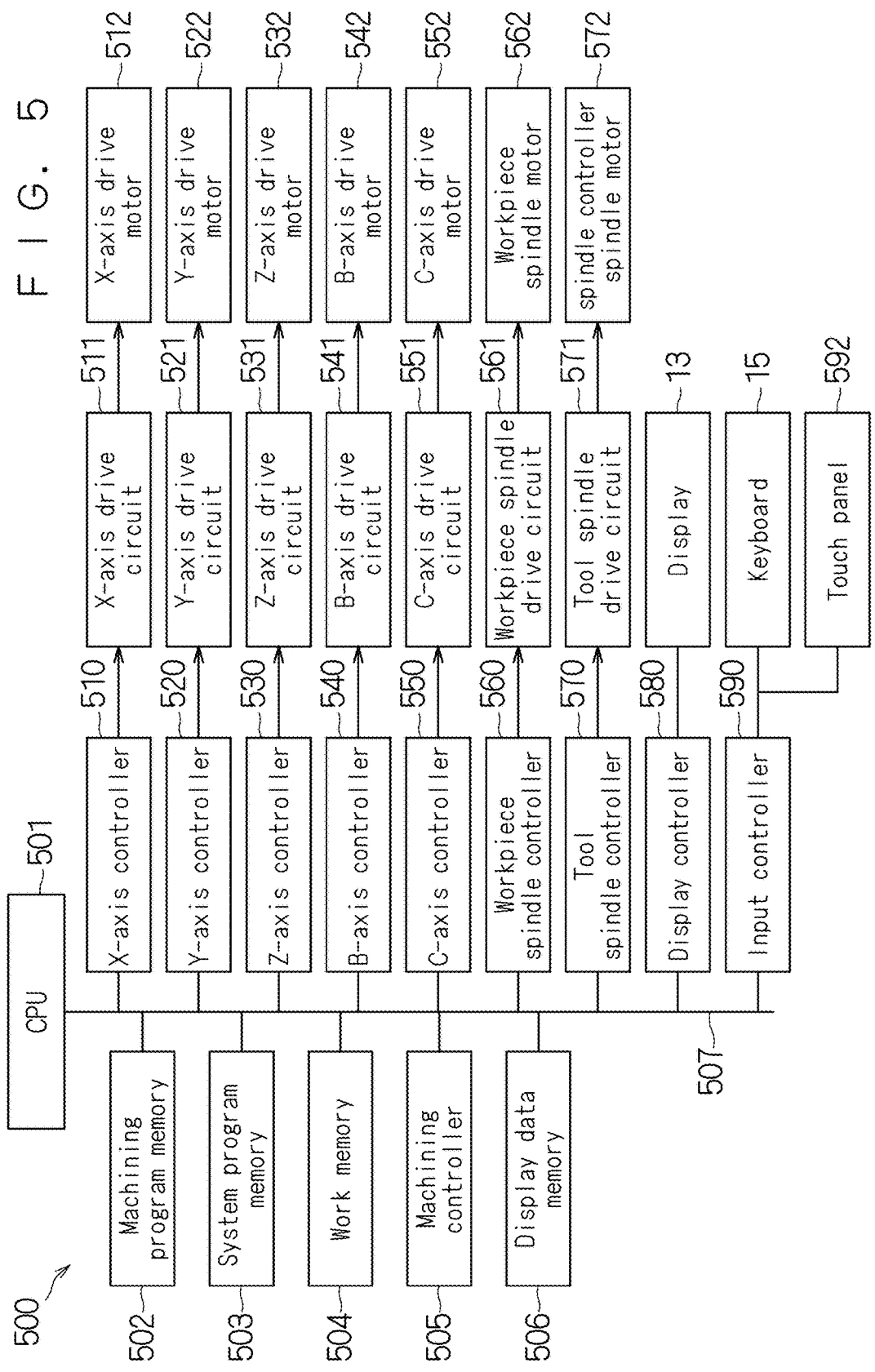

FIG. 9B
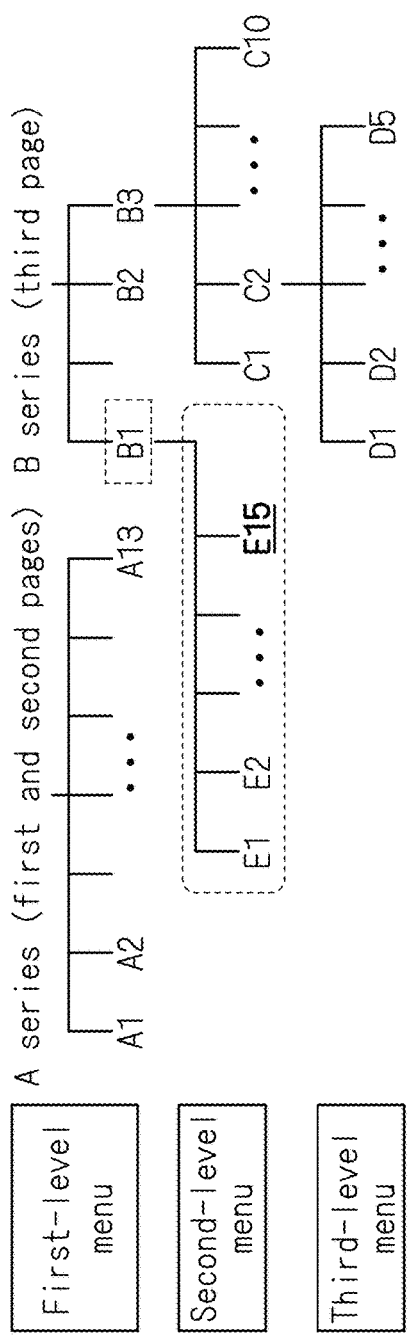
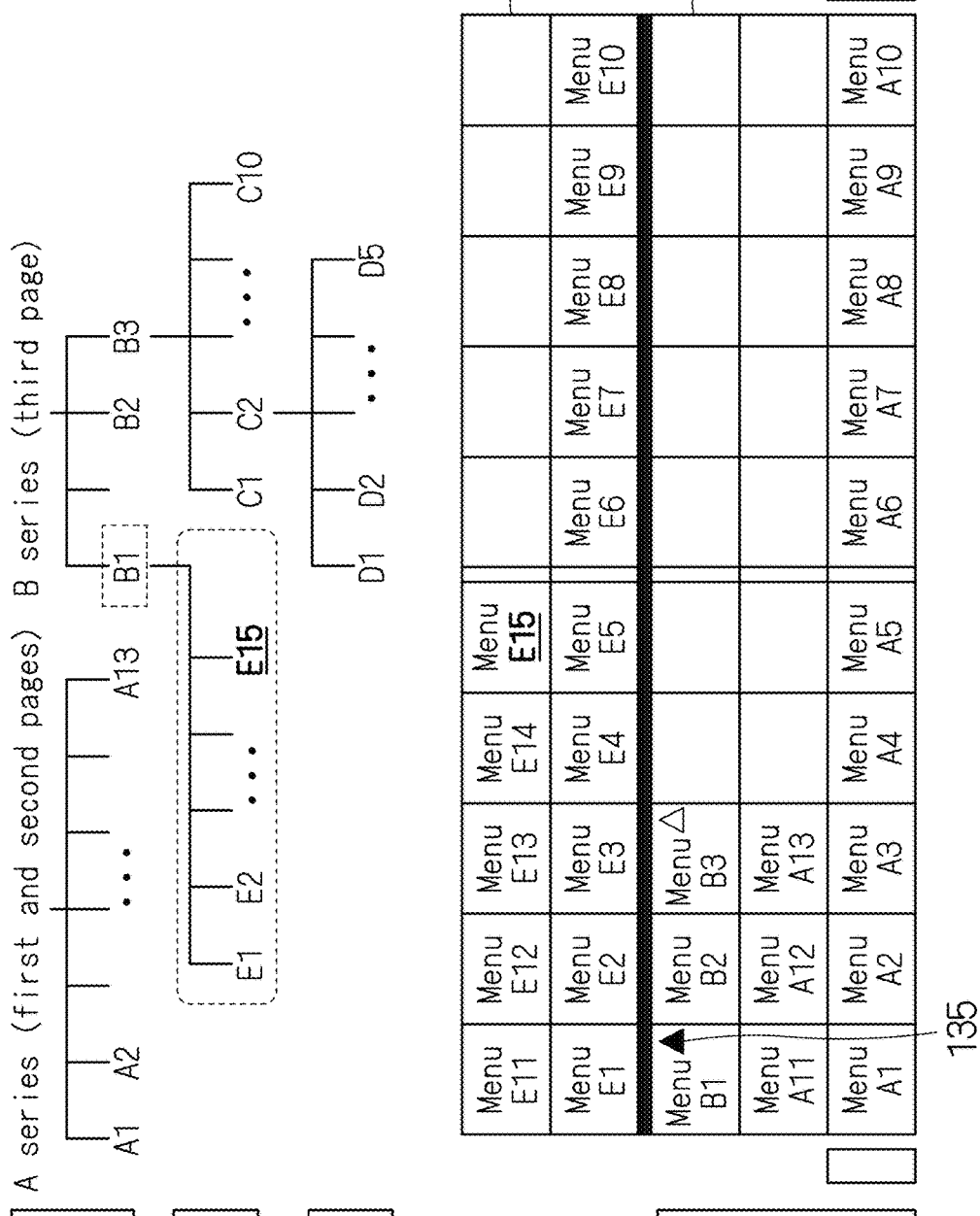

F I G. 1 0 A
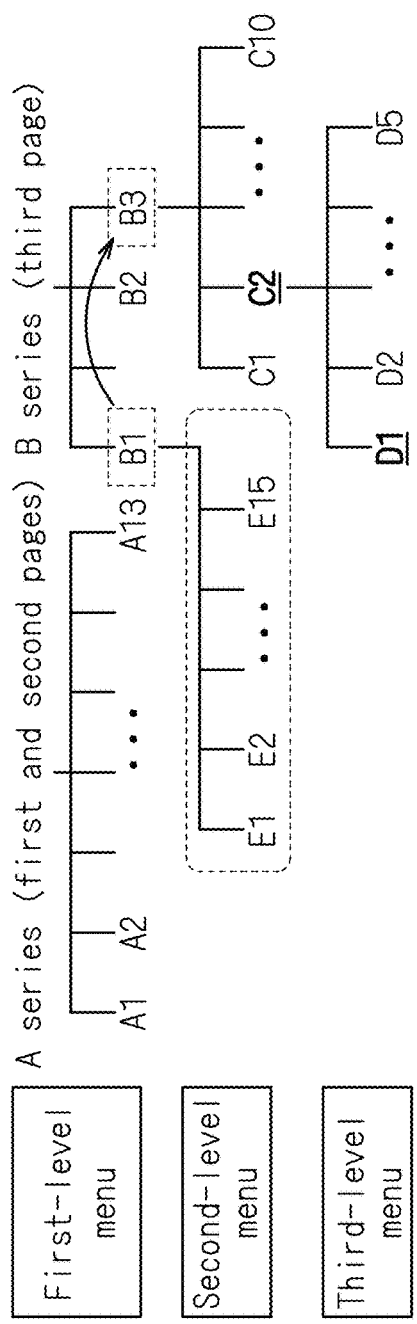
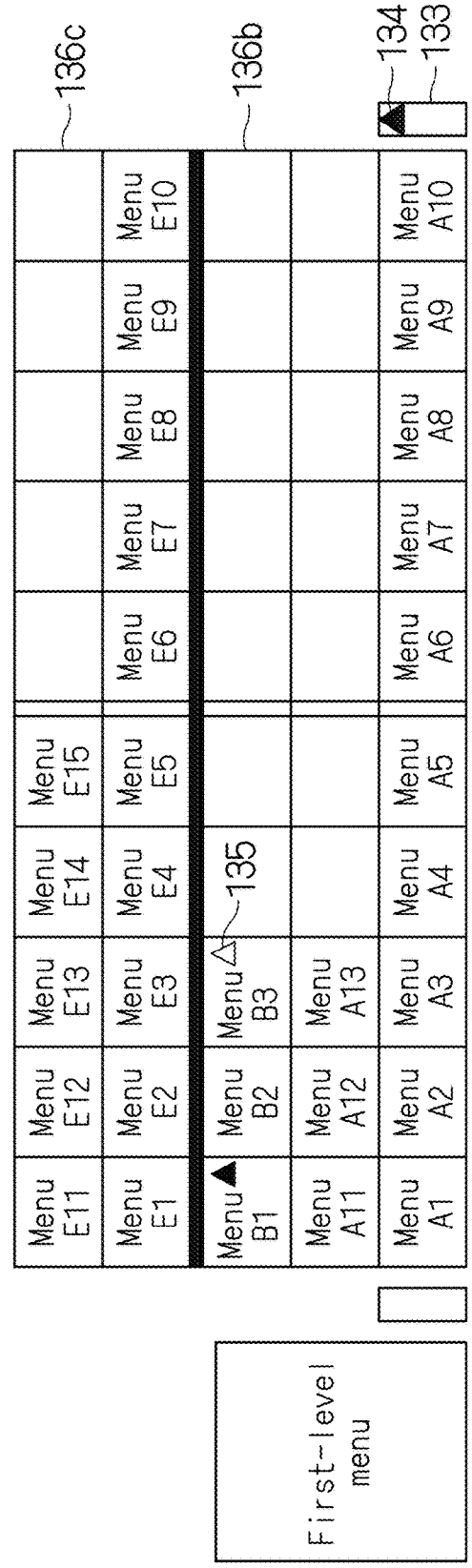

F I G. 1 0 B
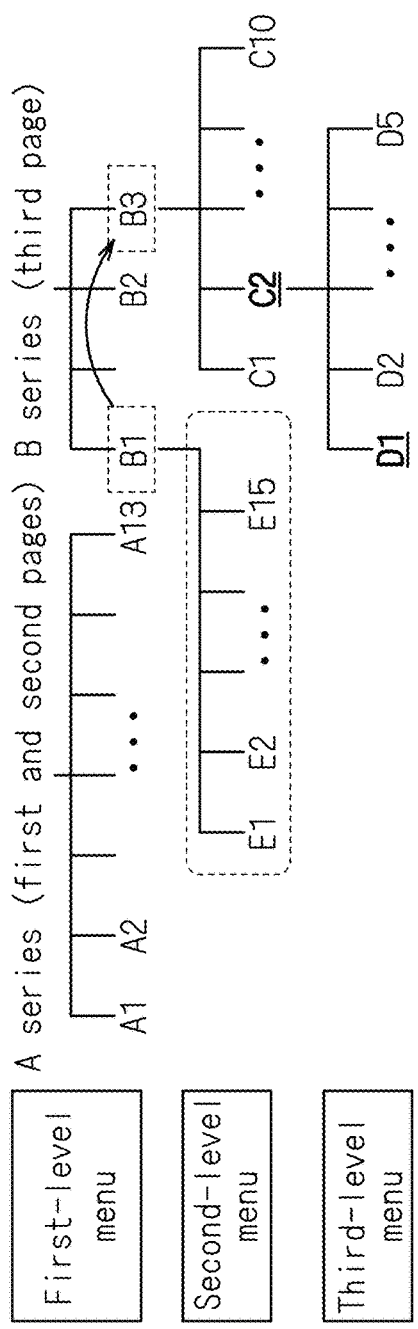
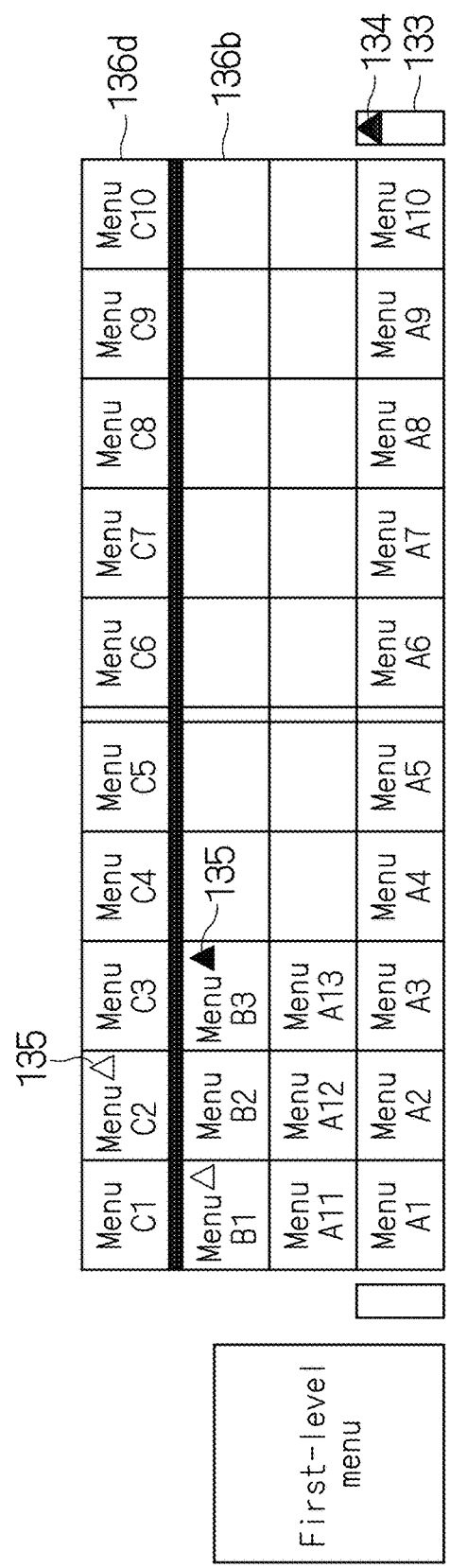

FIG. 11A

| Bar | Copying | Shading | End surface | Threading | Grooving | Lathe-turning drill | Lathe-turning tap | | Same finishing allowance 138a |
|---|---|---|---|---|---|---|---|---|---|
| Program end | Search | Calculate | TPC | Insert | Erase | Shape copy | Unit copy | Program copy | Help 137b |
| Select head | Transfer workpiece | Process end | | Basic coordinate shift | | | Simultaneous machining | Double-workpiece machining | >>> |
| △ C-axis point machining | △ C-axis line machining | Index | M code 135 | Sub-program | Coordinate measurement | Workpiece measurement | Tool measurement | Workpiece shape | >>> |
| △ Point machining | △ Line machining | △ Face machining | ▲ Lathe-turning | Single action | Basic coordinates | Auxiliary coordinates | End | | >>> 134 133 |

FIG. 11B

| Line center | Line right | Line left | Line outside | Line inside | Chamfer right | Chamfer left | Chamfer outside | Chamfer inside | |
|---|---|---|---|---|---|---|---|---|---|
| Program end | Search | Calculate | TPC | Insert | Erase | Shape copy | Unit copy | Program copy | Help |
| Select head | Transfer workpiece | Process end | | Basic coordinate shift | | | Simultaneous machining | Double-workpiece machining | >>> |
| △ C-axis point machining | △ C-axis line machining | Index | M code | Sub-program | Coordinate measurement | Workpiece measurement | Tool measurement | Workpiece shape | >>> |
| △ Point machining | △ Line machining | △ Face machining | △ Lathe-turning | Single action | Basic coordinates | Auxiliary coordinates | End | | >>> |

FIG. 12A

| Uno. | Unit | Machining portion | Cut-X | Cut-Z | Finishing allowance-X | Finishing allowance-Z |
|------|------|-------------------|-------|-------|----------------------|----------------------|
| 4 | Bar | Outer diameter | | | | |

— 131

| △ Point machining | △ Line machining | △ Face machining | △ Lathe-turning | Single action | Basic coordinate | Auxiliary coordinates | End | | >>> |
|---|---|---|---|---|---|---|---|---|---|

134 — ◁
133
137a

First-level menu

FIG. 12B

| Bar | Copying | Shading | End surface | Threading | Grooving | Lathe-turning drill | Lathe-turning tap | | Same finishing allowance | 138a / 137b |
|---|---|---|---|---|---|---|---|---|---|---|
| Program end | Search | Calculate | TPC | Insert | Erase | Shape copy | Unit copy | Program copy | Help | |
| Select Transfer workpiece | Process end | | Basic coordinate shift | | | | Simultaneous machining | Double-workpiece machining | >>> | |
| △ C-axis point machining | △ C-axis line machining | Index | M code | Sub-program | Coordinate measurement | Workpiece measurement | Tool measurement | Workpiece shape | >>> | |
| △ Point machining | △ Line machining | Face machining | ▲ Lathe-turning | Single action | Basic coordinates | Auxiliary coordinates | End | | >>> | |

134 / 133

First-level menu

DEVICE HAVING MENU DISPLAY FUNCTION

CROSS-REFERENCE TO RELATED APPLICATIONS

The present application is a continuation application of International Application No. PCT/JP2014/073321, filed Sep. 4, 2014. The contents of this application are incorporated herein by reference in their entirety.

BACKGROUND OF THE INVENTION

Field of the Invention

The present invention relates to a device having a menu display function.

Discussion of the Background

There is a device including menu switches that are operated to implement various functions. A menu is made up of a plurality of menu switches and displayed in a display unit. From this menu, a predetermined menu switch is selected using keys such as a cursor key, function keys, and an Enter key on a keyboard and a control panel so as to generate desired data, texts, and programs, for example. Software such as word processing software, presentation material preparation software, and data table preparation software that operate in a PC (Personal Computer) as an example of the device includes a plurality of menus and menu switches described above. As another example of the device, there is a numerical controller (CNC; Computerized Numerical Control) to control a movement amount and a movement speed, for example, of a tool of a machine tool by a computer using numerical values.

Japanese Unexamined Patent Application Publication No. 07-78016 discloses a technique concerning menu display of this numerical controller. Specifically, Japanese Unexamined Patent Application Publication No. 07-78016 recites "The operator to operate the numerical controller cannot directly know from the screen a hierarchical structure of menu items (menu switches) having the hierarchical structure. This has caused a problem that unless the operator fully memorizes this hierarchical structure, the operator cannot readily select a target function. It is therefore an object of the present invention to provide a numerical controller having a menu display function to perform display that facilitates the operator's understanding of the menu hierarchical structure so as to facilitate function selection".

Consequently, in the technique of Japanese Unexamined Patent Application Publication No. 07-78016, in the numerical controller having a function to display a group of functions of the hierarchical structure as menus, a multi-window environment is used in which the screen is divided into rectangular areas into which figures and texts are output. That is, in the environment in which rectangular areas called windows are displayed, windows can be displayed as if superposed on each other, a window can be displayed on the front, a window can be moved, a window can be erased, and superposition of windows can be changed, for example. In such a multi-window environment, one menu is displayed in one menu window. A menu window displayed on the front is referred to as main menu window. Menu windows other than the main menu window display menus at upper levels and superposed on each other while slightly deviating from each other. As a menu is to the rear, the menu is at an upper level. In this manner, menus at upper levels than a menu currently displayed are displayed in accordance with the hierarchical structure. Also, a mark to indicate existence of menus at lower levels is displayed on the displayed portion. Thus, it is possible to readily understand the menu hierarchical structure.

In this manner, in the numerical controller, one level includes a plurality of menu switches, and such menu switches constitute a plurality of levels. It is noted that in accordance with an increase in high functionality of the numerical controller, the number of levels of menu switches and the number of menu switches at one level tend to increase.

SUMMARY OF THE INVENTION

According to one aspect of the present invention, a device has a function of displaying control functions of the device as menus of a hierarchical structure to select and input the control functions. The device includes a CPU and a touch-panel display. The CPU is configured to control the whole device. The touch-panel display includes a menu display selection area and a data display area. The menu display selection area is to display one or more menu switches collectively as a menu. The menu switches are configured to select the control functions. The data display area is to display a result of operation of a control function that corresponds to a menu switch pressed down. The touch-panel display includes a first display mode and a second display mode. In the first display mode, when the control functions that belong to a first level, which is an uppermost level of the hierarchical structure, are assigned to menu switches of a plurality of menus, a specific one of the plurality of menus is displayed. In the second display mode, all of the plurality of menus are displayed without overlapping with each other. The touch-panel display includes a change switch configured to switch between the first display mode and the second display mode in the menu display selection area. The change switch includes a plural-row mark to indicate that a plurality of menus exist at the first level. The CPU is configured to switch between the first display mode and the second display mode to display the specific one menu or all of the menus in the menu display selection area of the touch-panel display. When a plurality of menus exist at the first level, the plural-row mark is displayed, and when a plurality of menus do not exist at the first level, the plural-row mark is erased. When the menus are displayed in the second display mode, the plural-row mark is lit, and when the menu is displayed in the first display mode, the plural-row mark is unlit.

According to another aspect of the present invention, a device has a function of displaying control functions of the device as menus of a hierarchical structure to select and input the control functions. The device includes a CPU and a touch-panel display. The CPU is configured to control the whole device. The touch-panel display includes a menu display selection area and a data display area. The menu display selection area is to display one or more menu switches collectively as a menu. The menu switches are configured to select the control functions. The data display area is to display a result of operation of a control function that corresponds to a menu switch pressed down. The touch-panel display includes a first display mode and a second display mode. In the first display mode, when the control functions that belong to a first level, which is an uppermost level of the hierarchical structure, are assigned to menu switches of a plurality of menus, a specific one of the plurality of menus is displayed. In the second display mode, all of the plurality of menus are displayed without overlapping with each other. The touch-panel display includes a change switch configured to switch between the first display mode and the second display mode in the menu display selection area. The change switch includes a plural-row mark to indicate that a plurality of menus exist at the first level. The CPU is configured to switch between the first display mode and the second display mode to display the specific one menu or all of the menus in the menu display selection area of the touch-panel display. A menu switch to which a menu includes menu switches that belong to a lower level is connected includes a lower-level mark to indicate existence of the menu that belongs to the lower level. The touch-panel display includes a third display mode in which the menu includes the menu switches that belong to the lower level is displayed to be adjacent to a menu at a level, to which the menu switch with the lower-level mark belongs, without overlapping. The touch-panel display includes a switch configured to display the menu including the menu switches that belong to the lower level in the third display mode.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1A, 1B, 1C, and 1D are diagrams illustrating a concept of the embodiment of the present invention;

FIG. 2 is an external view of a machine tool including a numerical controller, which is an exemplary device to which the embodiment of the present invention is applied;

FIG. 3 is a diagram illustrating an exemplary configuration of a display;

FIGS. 4A and 4B are diagrams illustrating an exemplary first multiple-row menu display in the numerical controller of the machine tool;

FIG. 5 is a diagram of hardware configuration inside of the numerical controller;

FIGS. 9A and 9B are diagrams illustrating a second embodiment of the present invention;

FIGS. 10A and 10B are diagrams illustrating a third embodiment of the present invention;

FIGS. 11A and 11B are diagrams illustrating an exemplary second multiple-row menu display; and FIGS. 12A and 12B are diagrams illustrating a fourth embodiment of the present invention.

DESCRIPTION OF THE EMBODIMENTS

Figure 1A:
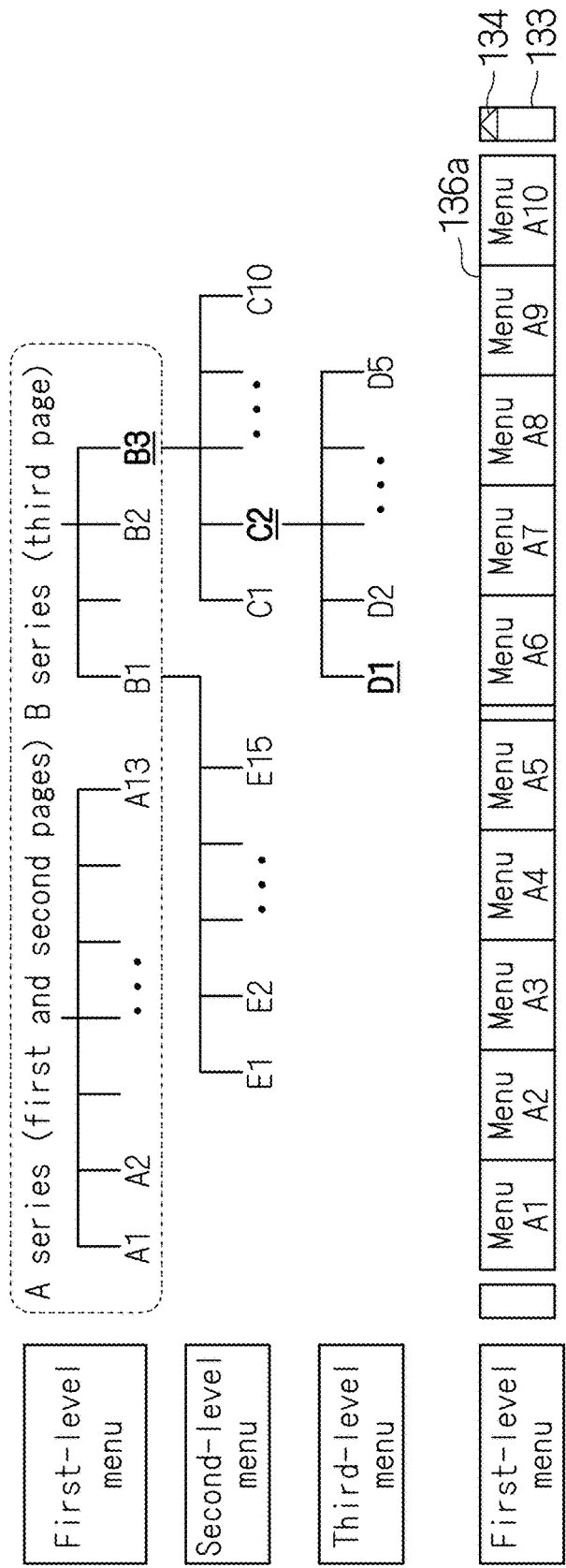

The embodiments will be described below with reference to the accompanying drawings, wherein like reference numerals designate corresponding or identical elements throughout the various drawings. In the following description, various kinds of information will be described using expressions such as "management table". Various kinds of information, however, may be described using data structures other than tables. In order to indicate not depending on data structures, "management table" may be referred to as "management information".

In some cases, processing will be described with "program" used as the subject. The program makes a processor and a controller such as a CPU (Central Processing Unit), an MP (Micro Processor), and a micro controller perform predetermined processing. The processor and controller may include exclusive hardware other than the CPU. A computer program may be installed in each computer from a program source. The program source may be provided through a server device or a recording medium, for example.

Each element such as a controller can be identified with a numeral, for example. Other kinds of identification information such as a name, however, may be used insofar as they are information that can identify each element. In the drawings and description of this embodiment, the same components are denoted with the same reference symbols. The embodiment of the present invention, however, should not be limited to this embodiment. All kinds of applications that accord with the spirit of the embodiment of the present invention are included in the technical scope of the embodiment of the present invention. Unless particularly limited, the number of elements of each kind may be one or more than one.

Embodiment Concept

FIGS. 1A, 1B, 1C, and 1D are diagrams illustrating a concept of the embodiment of the present invention. As a display unit of this embodiment, a touch-panel display device such as a touch-panel liquid crystal display device is supposed.

There is a switch displayed on the screen that is changed in appearance in accordance with a state of, for example, the screen and the cursor position. One control function is assigned to the switch. When pressed down, the switch implements the assigned control function. Here, this switch will be referred to as menu switch. A menu switch group including one or a plurality of menu switches will be referred to as menu.

In a numerical controller to control a machine tool, various control functions such as input of data such as machining programs and control of the screen are assigned to menu switches so as to implement the various functions.

In recent years, the functionality of the numerical controller has been raised to increase control functions assigned to menu switches. This hinders assignation of related control functions to menu switches in one menu. This situation is coped with by assigning control functions to a plurality of menus and changing a page of a menu to the next page by a menu change switch.

Alternatively, the situation is also coped with by dividing a large number of control functions into groups in consideration of their relationship, classifying the groups into some levels, and assigning the large number of control functions to menu switches of menus of multiple levels.

FIGS. 1A, 1B, 1C, and 1D are exemplary images of menus including a plurality of pages and multiple levels.

A first-level menu is a menu to be displayed first when data can be input and edited. A second-level menu is a menu at a lower level of "B1" menu switch and "B3" menu switch at the first level. The second-level menu is displayed when "B1" menu switch and "B3" menu switch are pressed down. A third-level menu is a menu at a lower level of "C2" menu switch at the second level. The third-level menu is displayed when "C2" menu switch is pressed down. Here, the first level is expressed as the uppermost level. As the number increases, the number expresses a lower level. As the number decreases, the number expresses an upper level.

In the state illustrated in FIG. 1A, when "B3" menu switch, not displayed, is to be pressed down, conventionally, a menu change switch 133 is pressed down once to shift to the state illustrated in FIG. 1B, and the display changes from menu 136*a* to menu 136*a*1. Target "B3" menu switch, however, is not displayed yet. Consequently, the menu change switch 133 is pressed down again to shift to the state illustrated in FIG. 1C, and then, menu 136*a*2 is displayed to show target "B3" menu switch finally. Then, "B3" menu switch is pressed down to implement control function "B3". In this manner, when a large number of menus are at the same level, it is difficult to comprehend an overall picture of the menu switches at the same level. This has been a cause to degrade operational efficiency. In view of this, in this embodiment, a plural-row mark 134 to display a multiple-row menu is provided for the menu change switch 133.

A numerical controller 500 (see FIG. 2 or FIG. 5) detects that the plural-row mark 134 of the menu change switch 133 has been pressed down, and forms signal-row menus 136*a*, 136*a*1, and 136*a*2 made up of menus of a single row into a menu of a plurality of rows, as illustrated in FIG. 1D, to display a multiple-row menu 136*b*. In this manner, the menu switches belonging to the same level (totally 16 menu switches "A1" to "A13", and "B1" to "B3") are all displayed in a list.

The operator confirms that the menu change switch 133 on the screen includes the plural-row mark 134 that indicates that a plurality of menus are at the same level illustrated in FIGS. 1A-1C. Then, using the touch panel, the operator presses down the plural-row mark 134 of the menu change switch 133 on the screen. The device detects that the plural-row mark 134 of the menu change switch 133 has been pressed down, and, as illustrated in FIG. 1D, the device changes the menu display from the single-row menu display to the multiple-row menu display.

Then, the numerical controller 500 lights the plural-row mark 134.

In this manner, a single key operation makes it possible to display menu switches at the same level in a list of a plurality of rows that do not overlap with each other. Thus, it is possible for the operator to quickly select and press down target "B3" menu switch.

External View of Machine Tool Including Numerical Controller

FIG. 2 is an external view of a machine tool including the numerical controller 500, which is an example of the device to which the embodiment of the present invention is applied.

As illustrated in FIG. 2, the machine tool 1 is surrounded by a splash guard, for example. In a machining area inside of the splash guard, a workpiece is machined by a tool attached to the tool spindle. The splash guard includes a transparent monitor window 11 made of acryl and tempered glass, for example, for the operator to monitor the machining area.

A console 12 is supported at a position in the vicinity of the monitor window 11 and operable by the operator monitoring the machining area from the monitor window 11. The console 12 includes a display 13 and an operator panel 14. The display includes a liquid crystal display device, for example. The operator panel 14 includes a keyboard 15 and an input key group 16 including operation keys and arrow keys. In one embodiment of the present invention, the display 13 is described as a touch-panel liquid crystal display. The numerical controller 500 has a configuration including the console 12. The detailed configuration will be described by referring to FIG. 5.

Display Configuration

FIG. 3 is a diagram illustrating an exemplary configuration of the display. The display 13 is a touch-panel liquid crystal display including a data display area 131 and a menu display selection area 132. The data display area 131 displays various information in the numerical controller 500 by switching between screens such as a position screen and a program screen. The position screen is for displaying, for example, loads and current position information of elements such as a workpiece spindle, a tool spindle, and each drive shaft of the machine tool 1 when the machine tool 1 is operated by, for example, menu switches and other operation keys. The program screen is for displaying, for example, machining program data. The menu display selection area 132 serves to display and select, for example, menu switch icons (hereinafter abbreviated as menu switches) for preparing, for example, machining programs.

For example, the menu display selection area 132 includes a menu change switch 133, a switch icon for a screen change menu (hereinafter abbreviated as screen change menu switch) 139, and a menu 137*a*. The menu change switch 133 includes a plural-row mark 134. The screen change menu switch 139 is for changing screen display of the data display area 131. The menu 137*a* includes one or more menu switches that indicate functions (for example, "lathe-turning" menu switch 1323). The "lathe-turning" menu switch 1323, for example, includes a lower-level mark 135 to indicate existence of a connected lower menu level (hereinafter abbreviated as lower level). When the menu switch with this lower-level mark is pressed down, it is possible to display the lower-level menu at the same time. It is noted that the menu change switch 133 or the screen change menu switch 139 may be disposed in the data display area 131 or the operator panel 14 instead of the menu display selection area 132 of the display 13.

As an exemplary basic configuration of a machining program in the numerical controller 500, there are units such as a common unit, a basic coordinate unit, a machining unit, and an end unit. On the program screen shown in the data display area 131 in FIG. 3, a menu is displayed when the cursor is on a unit kind-specific data display 1313 of, for example, the machining unit. The displayed menu includes, as B series at the first level, menu switches of point machining, line machining, face machining, lathe turning, single action, basic coordinates, auxiliary coordinates, end, C-axis point machining, C-axis line machining, index, M code, sub-program, coordinate measurement, workpiece measurement, tool measurement, workpiece shape, head select, transfer workpiece, process end, basic coordinate shift, simultaneous machining, and double-workpiece machining. The displayed menu includes, as A series, program end, search, calculate, TPC, insert, erase, shape copy, unit copy, program copy, and help. A menu switch 1325 for scroll (">>>") has a function to change to a next menu of B series. It is noted that A series is an operation menu of, for example, insertion and erasion of data lines on the program screen. A series implements a control function of displaying a message for prompting a next operation in accordance with a menu switch pressed down and changing the screens. B series is a menu for unit kind-specific data input. B series implements a control function of making the unit kind-specific data input to a predetermined portion of the program data by pressing down the menu switch.

Further, the menu switches of point machining and C-axis point machining in B series at the first level include, at the second level lower than the first level, menu switches of drill, stepped hole, inverse stepped hole, reamer, tap, boring, back boring, perfect circle hole, and counterbore tap. The menu switch of boring at the second level further includes, at the third level lower than the second level, menu switches of through-hole boring, blind-hole boring, stepped through-hole boring, and stepped blind-hole boring. The menu switches of line machining and C-axis line machining in B series at the first level include, at the second level lower than the first level, menu switches of line center, line right, line left, line outside, line inside, chamfer right, chamfer left, chamfer outside, and chamfer inside. The menu switch of face machining in B series at the first level includes, at the second level lower than the first level, menu switches of face mill, end mill surface, end mill ridge, pocket mill, pocket mill ridge, pocket mill valley, and end mill slot. The menu switch of lathe-turning in B series at the first level includes, at the second level lower than the first level, menu switches of bar, copying, shading, end surface, threading, grooving, lathe-turning drill, lathe-turning tap, and mill turning. In this embodiment, therefore, a device capable of displaying, in a list, all the menu switches at the first level and, in some cases, the menu switches at lower levels and selecting the menu switches will be described. The numerical controller 500 of the machine tool is an example of this device.

FIGS. 4A and 4B illustrate a specific example of the first multiple-row menu display in the numerical controller 500 of the machine tool.

FIG. 4A Single-Row Menu (Initial Display Menu)

When the cursor moves to the unit kind-specific data display 1313 to shift to an input waiting state of unit kind-specific data, a single-row menu as an initial display menu is displayed in the menu display selection area 132. Even if a plurality of menus are at the same level, the menus are displayed in a single row in an initial state. The reason is that since multiple-row menu display hides part of data on the program screen, operators used to single-row menus were considered.

The numerical controller 500 displays a single-row menu 137a from "point machining" to ">>>" of the menu switches for unit kind-specific data input. The numerical controller 500 displays lower-level marks 135 in the menu switches of "point machining", "line machining", "face machining", and "lathe-turning". These lower-level marks 135 enable the operator to readily discriminate menu switches having a lower level from menu switches having no lower level. The numerical controller 500 displays a plural-row mark 134 in a menu change switch 133. This plural-row mark 134 enables the operator to comprehend that menu switches other than displayed ones exist for data input of the cursor position. When the plural-row mark 134 of the menu change switch 133 is pressed down, a multiple-row menu can be displayed in the menu display selection area 132, as illustrated in FIG. 4B. It is noted that it may be also arranged that when a portion of the menu change switch 133 except the plural-row mark 134 is pressed down, a next menu is displayed in a single row.

FIG. 4B Multiple-Row Menu

In the multiple-row menu display, all the menu switches belonging to the first level can be displayed in a list without overlapping with each other, as indicated by reference numeral 137b. It is also possible for the operator to comprehend all of the menu switches provided with the lower-level marks 135. It is noted that although the plural-row mark 134 is unlit in the single-row menu display, the plural-row mark 134 is lit in the multiple-row menu display. When the plural-row mark 134 in the multiple-row menu display is pressed down again, it is possible to return from the multiple-row menu display to the single-row menu display. This operation and lit/unlit display enables the operator to comprehend in an instant that this switch alternately operates (the following operation is repeated: when the switch is pressed down once, the switch is turned on, and when the switch is pressed down again, the switch is turned off). Consequently, the operator can sensuously comprehend and readily remember this operation.

As described above, in the numerical controller 500, the plural-row mark 134 of the menu change switch 133 is merely pressed down once to display the menu switches at the first level in a list. Moreover, it is possible for the operator to readily comprehend which menu switch has a lower level. This enables the operator to prepare, for example, machining programs efficiently and in short time and to make less mistakes.

Hardware Configuration Diagram

FIG. 5 is a diagram of hardware configuration inside of the numerical controller 500.

The machine tool 1 includes the numerical controller 500 illustrated in FIG. 5. The numerical controller 500 includes a CPU 501 to control the whole device. A machining program memory 502 to store machining programs, a system program memory 503 to store programs for controlling the whole device (system), a work memory 504, a machining controller 505, and a display data memory 506 to store display data of the display 13 are connected to the CPU 501 through a bus line 507.

Also, a display controller 580 to control display in the display 13 and an input controller 590 to accept the input from the keyboard 15 on the console 12 and the input from a touch panel 592 disposed on the display 13 are connected to the CPU 501 through the bus line 507.

It is noted that the display data memory 506 stores various display data to be displayed in the display 13; in this embodiment, screen display image information such as the menu switches, the screen change menu switch 139, and machining programs.

Further, an X-axis controller 510, a Y-axis controller 520, a Z-axis controller 530, a B-axis controller 540, a C-axis controller 550, a workpiece spindle controller 560, and a tool spindle controller 570 are connected to the CPU 501 through the bus line 507. In response to axis (7 axes) movement commands from the CPU 501, these axis controllers 510 to 570 respectively output the axis movement commands to axis drive circuits 511, 521, 531, 541, 551, 561, and 571. In response to the movement commands, the drive circuits 511 to 571 respectively drive an X-axis drive motor 512, a Y-axis drive motor 522, a Z-axis drive motor 532, a B-axis drive motor 542, a C-axis drive motor 552, a workpiece spindle drive motor 562, and a tool spindle drive motor 572 of the axes (X-axis, Y-axis, Z-axis, B-axis, C-axis, workpiece spindle, and tool spindle). The above-described elements constitute the numerical controller 500. This, however, should not be construed in a limiting sense. For example, various memories may be integrated into one memory, and the memory may be divided into areas each of which stores various programs and various data.

Tables

Figure 6:
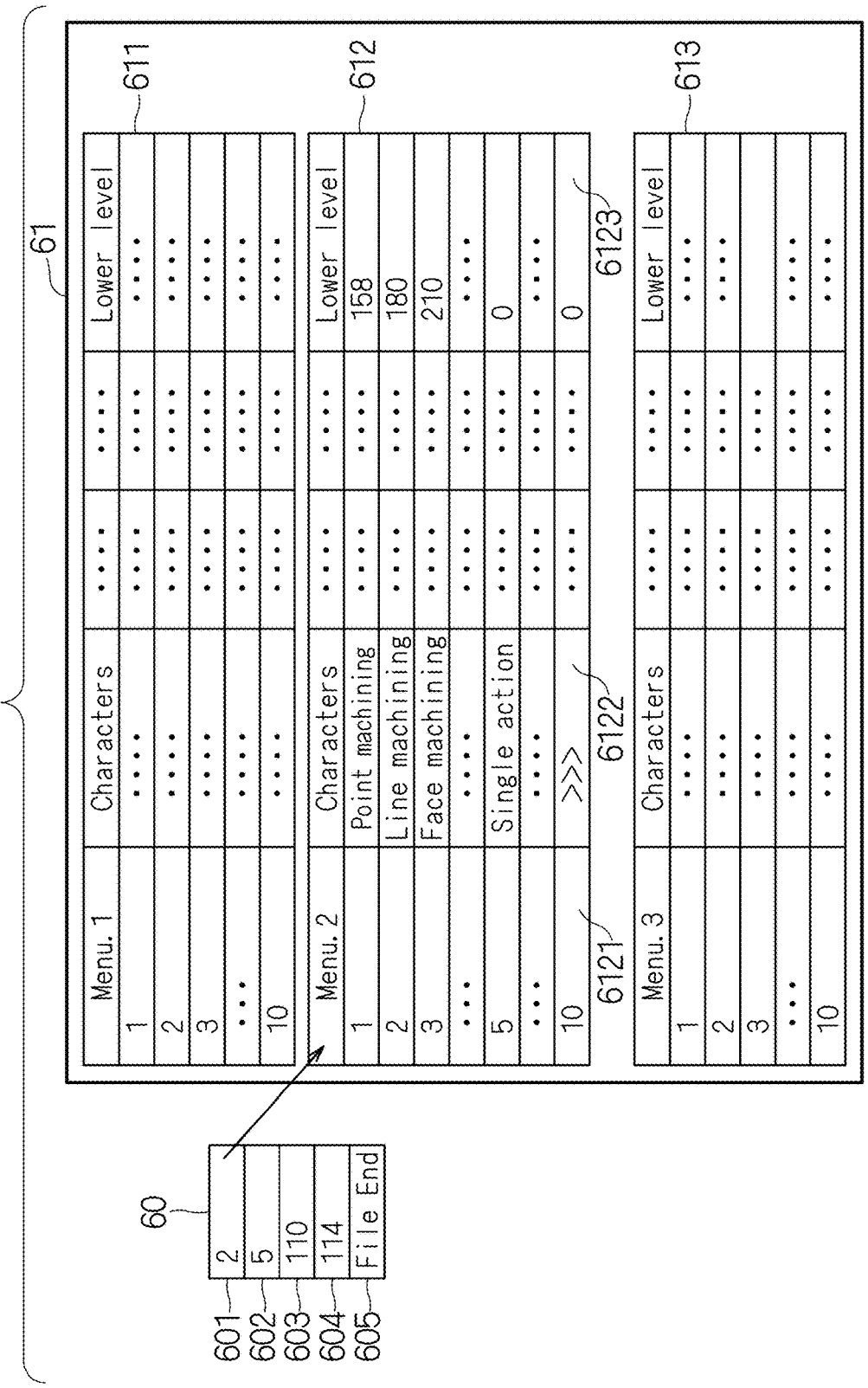
FIG. 6 is a diagram illustrating exemplary configurations of a same-level menu arrangement management table and a menu management table.

FIG. 6 is a diagram illustrating exemplary configurations of a same-level menu arrangement management table and a menu management table. FIG. 6 illustrates an exemplary configuration of the same-level menu arrangement management table 60. FIG. 6 illustrates an exemplary configuration of the menu management table 61.

The same-level menu arrangement management table 60 is a management table to store selectable menus determined by the screen and the cursor position currently displayed. It is a table in which menu numbers of menus changed in turn by pressing the menu change switch 133 are registered. At the time of the multiple-row menu display, all of the menus of the menu numbers in this table are displayed at once. It is noted that the same-level menu arrangement management table 60 is also prepared when there is one menu. The same-level menu arrangement management table 60 of this embodiment includes storage areas 601, 602, 603, and 604 to store the menu numbers. The storage areas respectively store menu numbers "2", "5", "110", and "114".

For example, menu number "2" stored in the storage area 601 indicates "Menu. 2" table in the menu management table 61. The same applies to menu number "5" stored in the storage area 602, menu number "110" stored in the storage area 603, and menu number "114" stored in the storage area 604. A storage area 605 stores information of "File End" that indicates that storing of the menu numbers is ended. It is noted that when one menu is stored, the storage area 601 stores menu number corresponding to the menu whereas the storage area 602, the storage area 603, and the storage area 604 store no menu number and are left blank. In this case, the storage area 602 may store "File End" information. It is noted that the same-level menu arrangement management table 60 is prepared each time the screen is changed, each time the cursor is moved, or each time the menu is changed at the time of pressing down the menu.

The menu management table 61 is a table concerning all the menus displayed in the menu display selection area 132 with the menu numbers being identification information. The menu management table 61 stores information of 10 menu switches (collectively referred to as menu information) displayed in each of the menus. Specifically, as illustrated in FIG. 6, a menu ("Menu. 1") table 611, a menu ("Menu. 2") table 612, a menu ("Menu. 3") table 613, and other menu tables exist. For example, the menu ("Menu. 2") table 612 includes a storage area 6122, a storage area 6123, and a storage area 6121. Concerning all the menu switches that constitute the menu 137a illustrated in FIG. 4A, the storage area 6122 stores textual information displayed in the menu switches, specifically, a character string from "point machining" to ">>>", or graphic information (icons). The storage area 6123 stores lower-level information of each of the menu switches, specifically, menu numbers at a connected lower level. The storage area 6121 stores information indicating a display order of the menu switches. It is noted that the menu numbers at lower levels are registered in the lower-level information, and menu number "0" indicates that there is no menu at a lower level.

Using the above-described menu information, display data of each menu is prepared.

For example, "point machining" menu switch including a lower level, to which a lower-level mark 135 is added, is displayed in the first box from the left. This operation is performed for each of the menu switches stored in the menu ("Menu. 2") table 612, and display data of 10 menu switches in one row is prepared. In a case of a multiple-row menu, the above-described processing is performed for each row based on information of the same-level menu arrangement management table 60. The processing is repeated times of the number of the menus registered in the table so as to prepare the multiple-row menu.

Processing Operation

Next, operations of display processing of an initial display menu and display change processing to a multiple-row menu will be described by referring to FIG. 7 and FIG. 8. It is noted that even if a plurality of menu numbers are registered in the same-level menu arrangement management table 60, a single-row menu is displayed in an initial state based on information registered in the top of the same-level menu arrangement management table 60. This menu will be referred to as initial display menu.

Display Processing of Initial Display Menu

Figure 7:
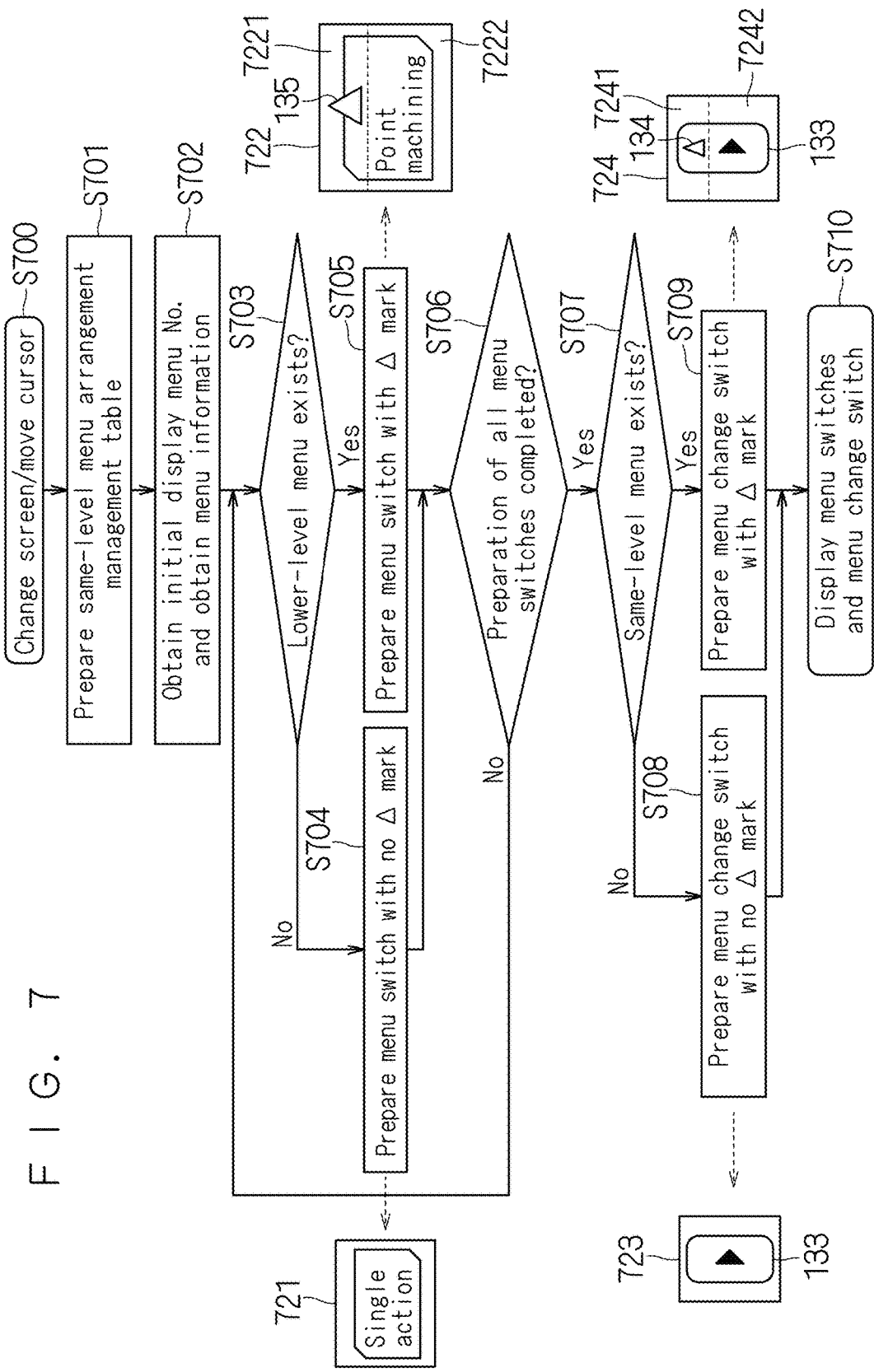
FIG. 7 is a flowchart of display processing of an initial display menu of a multiple-row menu.

FIG. 7 is a flowchart of display processing of an initial display menu. This processing S700 will be described with generation and display of the menu 137a as an example. Although the processing is supposed to be performed mainly by the CPU 501, the processing may be performed by the whole numerical controller 500. It is noted that this processing is started with display change and cursor movement as a trigger.

At S701, the CPU 501 prepares a same-level menu arrangement management table 60 in accordance with a changed screen or an item to which the cursor moves.

At S702, the CPU 501 obtains a menu number of an initial display menu stored in the prepared same-level menu arrangement management table 60. In this embodiment, specifically, information "2" in the storage area 601 on top of the same-level menu arrangement management table 60 is obtained, and menu information (display order information, textual information, lower-level information) stored in "Menu. 2" in the menu management table 61 is obtained.

Processing S703 to S706 is repeated times of the number of menu switches that constitute the menu, that is, in this embodiment, 10 times by changing "n" from 1 to 10.

At S703, using the obtained menu information, the CPU 501 makes a determination as to whether a lower-level menu exists concerning the n-th menu switch based on information obtained from the storage area 6123 of the lower-level information. For example, since "point machining" menu switch has a lower level when n=1, the CPU 501 performs S705. Since "single action" menu switch has no lower level when n=5, the CPU 501 performs S704.

At S704, the CPU 501 prepares display data of a menu switch with no lower-level mark 135, namely, no Δ (outlined triangle) mark in the display data memory 506. For example, when n=5, the CPU 501 prepares display data of "single action" menu switch denoted with reference numeral 721.

At S705, the CPU 501 prepares display data of a menu switch with Δ mark. For example, when n=1, the CPU 501 prepares display data 722 of a menu switch that is "point machining" menu switch to which a lower-level mark 135 (Δ mark) is added.

It is noted that when a lower-level mark 135 is added to a menu switch, a selection input area of the menu switch with the lower-level mark 135 (Δ mark), namely, the display area 722 of display data of the menu switch may be divided into two areas so as to use the lower-level mark as a switch. Of the two areas, an area 7221 is regarded as a selection input area of the lower-level mark (Δ mark), and an area 7222 is regarded as a single selection input area of the menu switch.

At S706, the CPU 501 makes a determination as to whether preparation of display data of all the menu switches is completed. Specifically, the CPU 501 makes a determination as to whether n=10. When the preparation is completed (Yes), the CPU 501 performs processing of S707. When the preparation is not completed (No), the CPU 501 gives increment of one to n and performs processing of S703 to S706 again.

At S707, the CPU 501 makes a determination as to whether there is a same-level menu based on the same-level menu arrangement management table 60. That is, the CPU 501 confirms from the same-level menu arrangement management table 60 whether a plurality of menu numbers are stored at the same level. When a plurality of menu numbers are not stored in the same-level menu arrangement management table 60, the CPU 501 determines that there is no same-level menu (single row). When two or more menu numbers are stored, the CPU 501 determines that there are same-level menus (multiple rows). When there are same-level menus, the CPU 501 performs S709. When there is no same-level menu, the CPU 501 performs S708.

At S708, the CPU 501 prepares display data 723 of a menu change switch with no Δ (outlined triangle) mark.

At S709, the CPU 501 prepares display data 724 of a menu change switch with a plural-row mark 134 (Δ mark).

It is noted that in a case of the menu change switch as well, in order to use as a switch the plural-row mark 134 of the menu change switch with the plural-row mark 134 (Δ mark), the display area 724 of the display data of the menu change switch may be divided into two areas. Of the two areas, an area 7241 is regarded as a selection input area for display change of multiple-row menus, and an area 7242 is regarded as a selection input area of the original menu change switch.

At S710, the CPU 501 displays in the menu display selection area 132 display data of the 10 menu switches and the menu change switch that are prepared in the display data memory 506 as a result of the above-described processing. Then, this processing is ended. It is noted that Δ marks of the menu switch with Δ mark and the menu change switch with Δ mark or the lower-level mark 135 and the plural-row mark 134 will be occasionally referred to as multiple-row menu icons.

Processing of Display Change to Multiple-Row Menu

Figure 8:
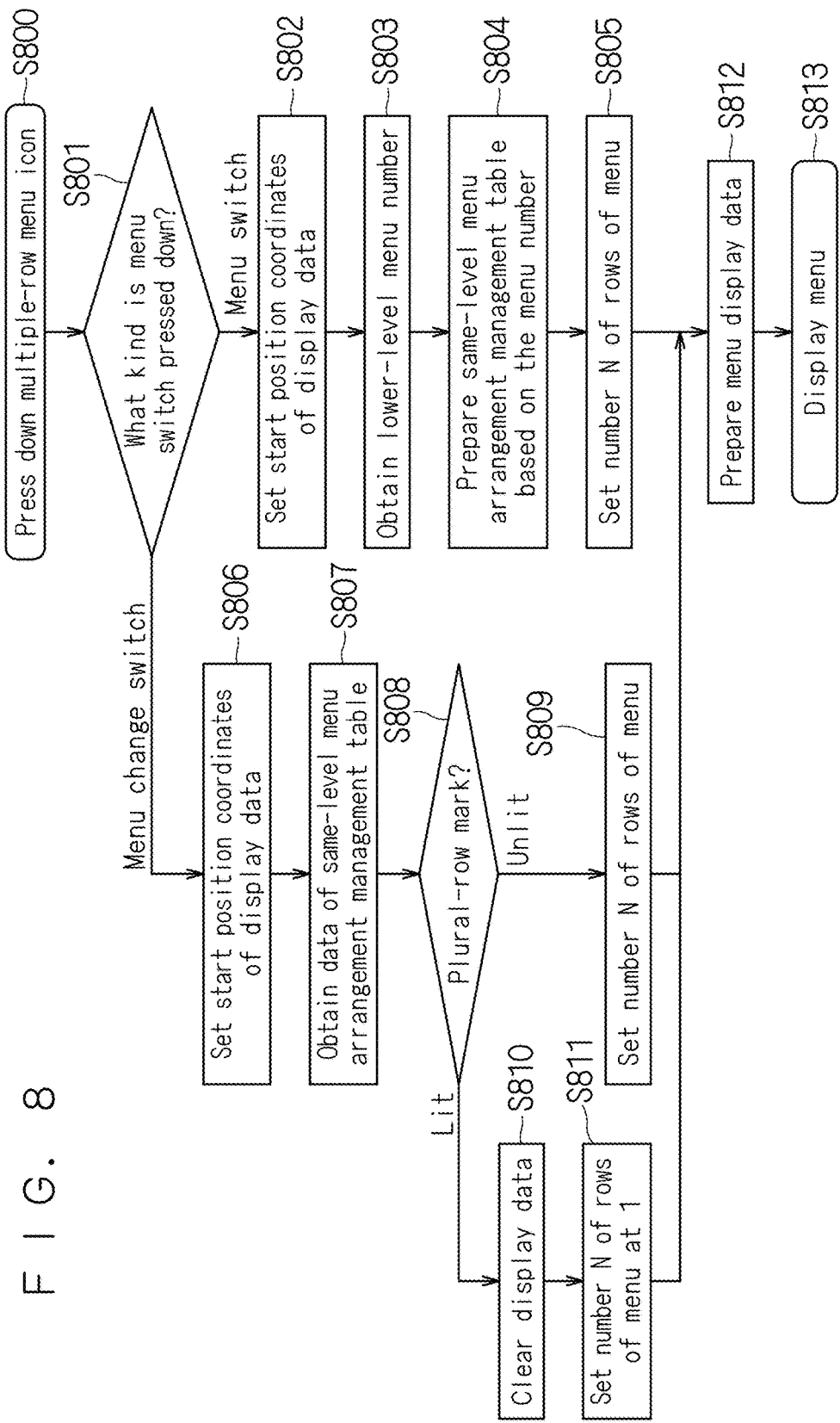
FIG. 8 is a flowchart of display change processing of a multiple-row menu.

FIG. 8 is a flowchart of processing of display change to a multiple-row menu. When the CPU 501 detects from the touch panel 592 through the input controller 590 that a multiple-row menu icon has been pressed down, the CPU 501 starts to perform this processing.

At S800, the CPU 501 detects that the multiple-row menu icon has been pressed down. As described above, the touch panel 592 detects that the operator has pressed down the selection input area 7241 of the plural-row mark 134 and the selection input area 7221 of the lower-level mark 135 and notifies the CPU 501 of kind-specific information of the key pressed down.

At S801, the CPU 501 makes a determination as to the kind of a switch to which the multiple-row menu icon pressed down is attached. When the switch is a "menu change switch", the CPU 501 performs S806. When the switch is a "menu switch", the CPU 501 performs S802.

At S802, the CPU 501 obtains coordinate values on the screen in the upper left corner of display data of the menu currently displayed and sets a display start position of a menu to be displayed next. This is for displaying the menu currently displayed and a lower-level menu to be displayed next adjacent to each other at the same time. The menu currently displayed includes the menu switch with the lower-level mark 135.

At S803, the CPU 501 obtains a menu number of lower-level information in menu information of the menu switch in the menu management table 61.

At S804, the CPU 501 prepares a same-level menu arrangement management table based on the lower-level menu number. Specifically, when one row is insufficient for menu switches of the lower-level menu, it suffices that an additional menu number is added to the same-level menu arrangement management table. Also, a plurality of menu numbers may be registered in lower-level information of the menu management table 61. It is noted that although not illustrated, the same-level menu arrangement management table of the lower level, which is different from the above-described same-level menu arrangement management table 60, is prepared in the same table configuration exclusively for the lower level.

At S805, based on the same-level menu arrangement management table prepared at S804, the number N of rows of the lower-level menu to be displayed is set.

At S806, in order to perform common processing of menu display data of multiple rows or s single row later, display start position coordinates of a menu of multiple rows or a single row to be displayed next are set.

At S807, the same-level menu arrangement management table 60 prepared in the processing of the initial menu display is obtained.

Next, at S808, a determination is made as to whether the plural-row mark 134 is lit or unlit. When the plural-row mark 134 is unlit, S809 is performed. When the plural-row mark 134 is lit, S810 is performed.

At S809, based on the obtained same-level menu arrangement management table 60, the number N of rows of the multiple-row menu is set.

At S810, in order to change the multiple-row menu display to single-row menu display, the display data of the multiple-row menu is erased once, and at S811, the number N of rows of the menu to be displayed is set at 1.

Then, at S812, based on the number N of menu rows, the same-level menu arrangement management table, and the menu display start position coordinates, which have been set in accordance with the conditions, the CPU 501 prepares display data of the multiple-row or single-row menu in the display data memory 506.

Finally, at S813, the CPU 501 displays the multiple-row or single-row menu display data prepared at S812 in the menu display selection area 132.

In this manner, the multiple-row menu icon is merely pressed once to display the menu in multiple rows. The menu switch having a lower level can also be displayed together with the upper-level menu display. This makes it possible for the operator to comprehend at the same time and conveniently the entire menu switches that belong to the same level and the hierarchical structure of the menu. This facilitates search of a target menu switch, reduces program preparation time, and increases efficiency.

It is noted that, as described above, the number of rows of the displayed menu is changeable depending on a situation. Consequently, the menu display selection area is changed in accordance with the number of rows of the menu.

Embodiment 2

Figure 9A:
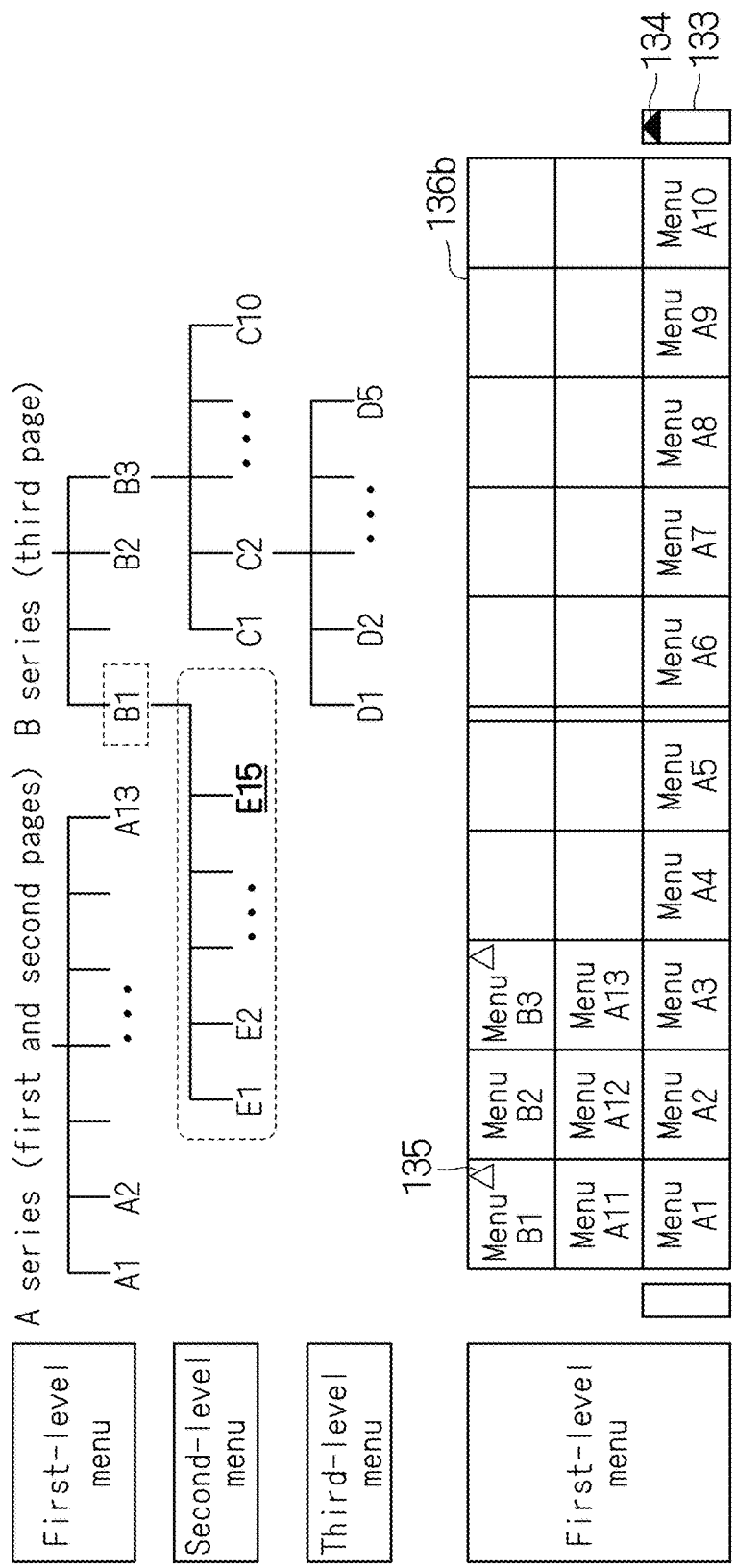

FIGS. 9A and 9B are diagrams illustrating a second embodiment of the present invention. In this embodiment, a function to display a list of lower-level menus by one key operation will be described. It is noted that in this embodiment, a case is supposed in which the operator intends to press down "E15" menu button of a second-level menu.

In FIG. 9A, menu switches of first-level menus are displayed in a multiple-row menu 136b. From this state, using the touch panel 592, the operator presses down the lower-level mark 135 of "B1" menu switch. When the numerical controller 500 (or the CPU 501) detects pressing of the lower-level mark 135, the numerical controller 500 displays a multiple-row menu 136c of "E series" level, which belongs to the second-level menu, in a list above and adjacent to the first-level menu, as illustrated in FIG. 9B. Also, the numerical controller 500 lights the lower-level mark 135 of "B1" menu switch. This makes it possible for the operator to press down "E15" menu switch.

In this manner, the lower-level menu is displayed above the upper-level menu. This makes it possible for the operator to comprehend the list of menu switches over the levels and readily find a target menu switch.

It is noted that when an area of the menu switch with the lower-level mark except the lower-level mark is pressed down, menu display in multiple rows is changed to single-row display of lower-level menus. As described above, the reason is that in the multiple-row display, some operators dislike that data displayed in the lower portion of the screen, namely, right above the menu, is hidden by the menu. It was considered that after the target lower-level menu is found, menu display can be performed with a single row as much as possible.

Embodiment 3

FIGS. 10A and 10B are diagrams illustrating a third embodiment of the present invention. Embodiment 3 solves the problem described above as follows: "When the operator makes a mistake in pressing down a menu switch and moves (shifts) to a lower-level menu, the operator returns to the upper level once and presses down a right menu switch to display the right menu. Otherwise, the operator cannot select the target menu switch". That is, when the operator makes a mistake in pressing down a menu switch, key operation can be continued without resetting from the first-level menu. This function will be described. In this example, a situation is supposed in which when the operator intends to press down "B3" menu switch to press down "C2" menu switch, the operator erroneously pressed down "B1" menu switch.

FIG. 10A illustrates a state in which a multiple-row menu 136c of "E series" level that belongs to the second-level menu is displayed in a list above the first-level menu 136b, and the lower-level mark 135 of "B1 " menu switch is lit. Consequently, the operator cannot find "C2" menu switch and realizes that the operator has made a mistake in pressing down the menu switch. Then, the operator presses down the lower-level mark 135 of "B3" menu switch.

FIG. 10B illustrates that display above the first-level menu 136b is changed from the second-level menu 136c of "E series" to a second-level menu 136d of "C series" and displayed in a list to press down "C2" menu switch. It is noted that in order to further press down "D1" menu switch in the lower third-level menu of "D series", it suffices that the lower-level mark 135 of "C2" menu switch is pressed down, as described in embodiment 1.

In this manner, even if a wrong lower-level menu is displayed, a target lower-level menu can be displayed by one key operation. Consequently, recovery operation from wrong operation can be readily thought of, and the number of key operations can be reduced. This decreases the number of program preparation steps and preparation time.
Exemplary Multiple-Row Menu Display 2

FIGS. 11A and 11B are diagrams illustrating exemplary second multiple-row menu display. FIGS. 11A and 11B illustrate an example in which the menu switches described by referring to FIGS. 9A, 9B, 10A, and 10B are displayed in a menu as specific menu switches.
FIG. 11A Multiple-Row Menu Display 1

This multiple-row menu display 1 illustrates menu display when a lower-level mark 135 of a menu switch having a menu at a lower level is pressed down at the time of inputting unit kind-specific data. In the state in which a multiple-row menu 137b of the first level for unit kind-specific data input is displayed, when the operator presses down the lower-level mark 135 of "lathe turning" menu switch, the numerical controller 500 detects pressing down, and displays in the menu display selection area 132 a lower-level menu (from "bar" to "same finishing allowance") 138a of "lathe turning" menu switch.
FIG. 11B Multiple-Row Menu Display 2

This multiple-row menu display 2 illustrates menu display when a lower-level mark 135 of "line machining" menu switch in the display state of FIG. 11A is pressed down. Lower-level menu display above the multiple-row menu 137b of the first level for unit kind-specific data input is changed from the lower-level menu (from "bar" to "same finishing allowance") 138a of "lathe turning" menu switch to a lower-level menu (9 menu switches from "line center" to "chamfer inside") 138b of "line machining" menu switch. When the lower-level mark 135 of "Lathe-machining" menu switch is pressed down again, it is possible to return to the display state of FIG. 11A. When lower-level marks 135 of other menu switches such as "face machining" menu switch and "C-axis point machining" are pressed down, it is possible to change display of the lower-level menu above the first-level multiple-row menu 137b.

Embodiment 4

FIGS. 12A and 12B are diagrams illustrating a fourth embodiment of the present invention. This embodiment 4 is a function to move the cursor on the program screen displayed in the data display area 131 to display all levels of menus including menu switches to which control functions to perform data input are assigned in a waiting state of the data input. This function will be described. In this example, a case will be described in which "bar" in the data display area 131 is changed to "end surface".
FIG. 12A The cursor is moved to "bar" on the program screen displayed in the data display area 131, and the plural-row mark 134 of the menu change switch 133 is pressed down. The CPU 501 recognizes that the cursor is in the unit kind-specific data display, and that the input data is "bar". The CPU 501 prepares a same-level menu arrangement management table for a multiple-row menu and a same-level menu arrangement management table of a lower-level menu of "lathe-turning" menu switch. The CPU 501 displays a multiple-row menu, as illustrated in FIG. 12B, in the menu display selection area 132. That is, a menu to implement a control function of editing data displayed in the data display area 131 is prepared as follows. A same-level menu arrangement management table 60 for unit kind-specific data input is prepared for the first level in accordance with normal processing. Next, by the input "bar" unit, a same-level menu arrangement management table for "lathe-turning" menu switch to which "bar" menu switch belongs is prepared. Based on the two same-level menu arrangement management tables, two multiple-row menus are superposed on each other.

It is noted that although data to be input may involve three levels, multiple-row menus can be readily prepared when levels to the lowermost level are possessed in tables, for example. In this case, a multiple-row menu becomes three stories high. In many cases, however, the lowermost level has one row.
FIG. 12B When the lower-level menu 138a including "bar" menu switch is displayed above the first-level menu 137b, the operator presses down "end surface" menu switch, and the CPU 501 detects pressing down and changes the content of the program. Thus, "bar" unit on the program screen can be changed to "end surface" unit.

In this manner, two key operations (pressing down the plural-row mark 134 and "end surface" menu switch) make it possible to quickly change program data that the operator intends to change. The number of program change steps and change time can be reduced to increase efficiency of program development. It is noted that in this example, a predetermined multiple-row menu is displayed by pressing down the plural-row mark 134 of the menu change switch 133. A multiple-row menu, however, as illustrated in FIG. 12B, may be displayed by pressing down the cursor portion. That is, instead of the principle of the initial display menu, all menus corresponding to the screen and the cursor position may be displayed in multiple-row menus from the beginning.

As has been described heretofore, in the embodiments of the present invention, it is possible to display a list of a plurality of menu switches of the hierarchical structure in multiple rows and select the menu switches. This makes it possible to specify a target menu switch in short time and readily comprehend the hierarchical structure. Consequently, a program can be prepared by a few key operations, and also, operation mistakes can be reduced. This increases efficiency of program development with the numerical controller 500. It is noted that although the numerical controller 500 of the machine tool is taken as an example in the embodiments, each of the embodiments of the present invention is applicable to a terminal to control the numerical controller 500 or an information processor such as a PC and a server. Each of the embodiment of the present invention is also applicable to, for example, a communication device such as a multifunction portable terminal and a cellular phone and a search device such as a car navigation.

It is noted that in the above-described embodiments, description was made using the menus for implementing control functions concerning data input and editing of machining programs. The numerical controller, however, has many other control functions. The embodiments of the present invention are effective for such control functions. For example, in monitoring an operation state of a machine tool, it is necessary to select a monitor target from a plurality of portions. A monitor physical quantity is selected from, for example, distance, speed, acceleration, current value, and heat. Concerning a monitor method as well, simple values are displayed in digital or analog forms, and a plurality of kinds of data are displayed in correlation with each other. For this purpose, control functions to be monitored are formed in a hierarchical structure and displayed in menus. This makes it possible for the user to readily find the optimum means from the monitor functions prepared by the manufacturer.

The present invention should not be limited to the above-described embodiments but may include various modifications. The above-described embodiments are in detail to facilitate understanding of the present invention. The present invention, however, should not necessarily be limited to the device including all the configurations described above. Moreover, part of the configuration of one embodiment is replaceable with the configuration of another embodiment. Also, to the configuration of one embodiment, the configuration of another embodiment may be added. Concerning part of the configuration of each embodiment, addition of other configurations, erase, and replacement are possible. Needless to say, part or all of the configurations, functions, processors, and processing means described above are realized by hardware or software, for example, by designing with integrated circuits. The control lines and information lines such as data lines, control lines, and bus lines, which are considered to be necessary for description, are illustrated.

In the device having the menu display function according to the embodiments of the present invention, the menu switches in accordance with need are displayed in a list without overlapping with each other. This facilitates selection of menu switches to improve ease of use.

Obviously, numerous modifications and variations of the present invention are possible in light of the above teachings. It is therefore to be understood that within the scope of the appended claims, the present invention may be practiced otherwise than as specifically described herein.

What is claimed is:

1. A device having a function of displaying control functions of the device as menus of a hierarchical structure to select and input the control functions, the device comprising:
    a CPU configured to control the whole device; and
    a touch-panel display comprising:
        a menu display selection area to display one or more menu switches collectively as a menu, the menu switches being configured to select the control functions; and
        a data display area to display a result of operation of a control function that corresponds to a menu switch pressed down,
    the touch-panel display comprising:
        a first display mode in which when the control functions that belong to a first level, which is an uppermost level of the hierarchical structure, are assigned to menu switches of a plurality of menus, a specific one of the plurality of menus is displayed; and
        a second display mode in which all of the plurality of menus are displayed without overlapping with each other,
    the touch-panel display comprising a change switch configured to switch between the first display mode and the second display mode in the menu display selection area,
    the change switch comprising a plural-row mark to indicate that a plurality of menus exist at the first level,
    wherein the CPU is configured to switch between the first display mode and the second display mode to display the specific one menu or all of the menus in the menu display selection area of the touch-panel display,
    wherein when a plurality of menus exist at the first level, the plural-row mark is displayed, and when a plurality of menus do not exist at the first level, the plural-row mark is hidden, and
    wherein when the menus are displayed in the second display mode, the plural-row mark is lit, and when the menu is displayed in the first display mode, the plural-row mark is unlit.

2. A device having a function of displaying control functions of the device as menus of a hierarchical structure to select and input the control functions, the device comprising:
    a CPU configured to control the whole device; and
    a touch-panel display comprising:
        a menu display selection area to display one or more menu switches collectively as a menu, the menu switches being configured to select the control functions; and a data display area to display a result of operation of a control function that corresponds to a menu switch pressed down, the touch-panel display comprising:

a first display mode in which when the control functions that belong to a first level, which is an uppermost level of the hierarchical structure, are assigned to menu switches of a plurality of menus, a specific one of the plurality of menus is displayed; and a second display mode in which all of the plurality of menus are displayed without overlapping with each other, the touch-panel display comprising a change switch configured to switch between the first display mode and the second display mode in the menu display selection area, the change switch comprising a plural-row mark to indicate that a plurality of menus exist at the first level, wherein the CPU is configured to switch between the first display mode and the second display mode to display the specific one menu or all of the menus in the menu display selection area of the touch-panel display, wherein a menu switch to which a menu comprising menu switches that belong to a lower level is connected comprises a lower-level mark to indicate existence of the menu that belongs to the lower level, the touch-panel display comprising a third display mode in which the menu comprising the menu switches that belong to the lower level is displayed to be adjacent to a menu at a level, to which the menu switch with the lower-level mark belongs, without overlapping, the touch-panel display comprising a switch configured to display the menu comprising the menu switches that belong to the lower level in the third display mode.

3. The device according to claim 2, wherein when the lower-level mark of the menu switch with the lower-level mark is pressed down, the menu comprising the menu switches that belong to the lower level is displayed in the third display mode, and wherein when an area of the menu switch with the lower-level mark except the lower-level mark is pressed down, the menu comprising the menu switches that belong to the lower level is displayed in the first display mode.

4. The device according to claim 2, wherein when a different lower-level mark of a menu switch with the different lower-level mark, which is different from the menu switch with the lower-level mark that belongs to the first level, is pressed down, the CPU displays in the menu display selection area a menu comprising menu switches that belong to the menu switch with the different lower-level mark in place of the menu comprising the menu switches that belong to the lower level.

5. The device according to claim 2, wherein when it becomes possible for the CPU to edit data that is selected and input by the menu displayed in the data display area, all menus belonging to levels are displayed without overlapping with each other, the levels comprising:

the first level to which a menu switch corresponding to a control function to select and input the data belongs;

a target level to which a menu switch configured to input data already input belongs; and a complementary level when the level exists between the first level and the target level.

6. The device according to claim 1, comprising a numerical controller of a machine tool.

7. The device according to claim 2, comprising a numerical controller of a machine tool.

* * * * *